United States Patent [19]

Nagao et al.

[11] 4,205,424
[45] Jun. 3, 1980

[54] METHOD OF FITTING SEALING MEMBER INTO FRICTIONALLY ENGAGING TUBULAR CONNECTOR

[75] Inventors: Shozo Nagao, Takarazuka; Yoshinobu Ohashi, Nishinomiya; Yuichi Watanabe, Yawata, all of Japan

[73] Assignee: Kubota, Ltd., Japan

[21] Appl. No.: 926,352

[22] Filed: Jul. 20, 1978

[30] Foreign Application Priority Data

Jul. 21, 1977 [JP] Japan ................................. 52-88067
Sep. 5, 1977 [JP] Japan ................................ 52-106909

[51] Int. Cl.$^2$ ............................................. B23P 11/02
[52] U.S. Cl. .......................................... 29/407; 29/451
[58] Field of Search ....................... 29/235, 407, 451; 285/184, 345, 374

[56] References Cited

U.S. PATENT DOCUMENTS

| 1,379,141 | 5/1921 | Vasselli | 285/184 X |
| 2,977,994 | 4/1961 | Xenis | 29/235 X |
| 3,140,534 | 7/1964 | Messina | 29/407 |
| 3,236,528 | 2/1966 | Bram | 29/451 |
| 3,257,719 | 6/1966 | Larkfeldt | 29/451 |
| 3,406,441 | 10/1968 | Larsson | 29/451 |
| 3,990,138 | 11/1976 | Bellia | 29/235 |

FOREIGN PATENT DOCUMENTS 1020026 2/1966 United Kingdom ..................... 29/235

Primary Examiner—Ervin M. Combs
Attorney, Agent, or Firm—Eric P. Schellin

[57] ABSTRACT

There is provided a tubular connector or the like comprising a socket like means and an annular elastic sealing member to be fitted into the socket in pressing contact with the inner peripheral surface thereof. To assist in the assembly of the sealing member internally of said socket the socket and sealing member is each provided with a plurality of marks spaced apart circumferentially thereof in corresponding relation to the other. The sealing member is fitted into the socket by inserting the sealing member into the socket with the marks on the sealing member set to the corresponding marks on the socket and pressing any slack portions or depressed portions of the member against the socket radially inwardly peripheral surface, whereby the sealing member is secured in uniform pressing contact with the said socket inner surface over the entire outer periphery of the sealing member. Alternatively the sealing member can be temporarily pressed against the socket by fastening them together by clamps at the positions where the marks are matched as above, followed by further clamping the resulting assembly at an unfastened portion by means of another clamping device possessing clamping rollers, the said device is moved arcuately with respect of said assembly.

3 Claims, 14 Drawing Figures

METHOD OF FITTING SEALING MEMBER INTO FRICTIONALLY ENGAGING TUBULAR CONNECTOR

BACKGROUND OF THE INVENTION

The present invention relates to a method of fitting an annular sealing ring or member into a female tubular connector which may be a pipe joint. More particularly, the invention relates to a method for assisting in fitting a sealing ring or member into a pipe joint of the slip-on type, that is, a joint or connector into which a smaller diameter pipe is inserted. The thereby connected pipes may be thereby secured in a frictionally engaging means or may be permanently thereby secured.

As the concept of the resultant assembly of a connector, that is socket, with its sealing member is known, a further discussion in the assembly of these two components is presented below as it will lead itself to a better discussion on behalf of the meritorious contribution herein presented.

Suffice it to say at this point that the assembly of the sealing member having a larger outside diameter than the inner diameter of the connector has presented assembly problems. These problems have made for slow assembly and/or have provided for the positioning of a sealing ring or member that does not thrust uniformly in all radial directions so that the member or ring may be dislodged.

SUMMARY OF THE INVENTION

This invention has overcome the above problems and provides a method by which the sealing member can be easily installed in position with a uniform press fit without necessitating any skill.

Stated more specifically, an object of this invention is to provide a method of fitting a sealing member or ring into a connector or pipe joint having a socket portion in which each of the socket portion and a sealing member is formed with a plurality of marks spaced apart circumferentially thereof in corresponding relation to the other, by inserting the sealing member into the socket portion with the marks on the former set to the marks on the latter to provide spaced apart slack portions or depressed portions in the sealing member and thereafter pressing the said slack portions or depressed portions against the inner peripheral surface of the socket.

Another object of this invention is to provide a method of fitting the sealing member into the socket by fastening them together by clamps at the positions where the marks on the former are set to those on the latter as above, further clamping the resulting assembly at a portion between the clamps by another device having clamp rollers and moving the device circumferentially of the assembly.

BRIEF DESCRIPTION OF THE DRAWINGS

FIG. 8 (II) is the same end view of FIG. 8 (I) illustrating the fitment of the sealing member in the female tubular member;

FIG. 12 (b) is a view showing the clamping means applicable to carrying out the precepts of the present invention;

FIG. 14 (b) is a view of the said device.

BACKGROUND OF THE INVENTION AND PRIOR SOLUTIONS

As was stated hereinbefore the present invention relates to a method and means for more expeditiously fitting a sealing member into an open ended female tubular member such as a pipe joint of the slip-in type or a socket. The term socket will be employed hereinafter as being most expeditious.

Figure 1:
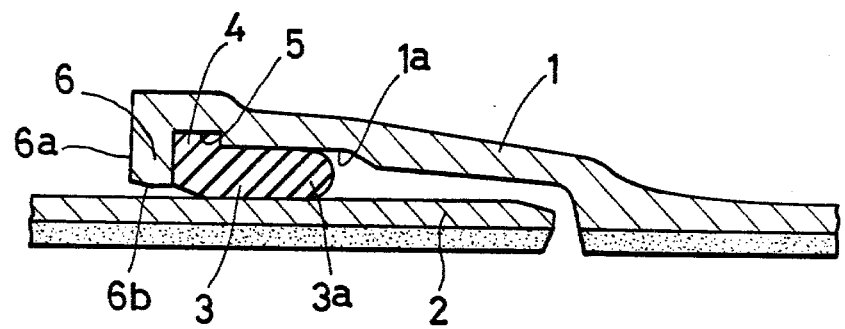
FIG. 1 is a fragmentary side elevation in vertical section illustrating an example of a prior art slip-on type male-female tubular joint.
Figure 2:
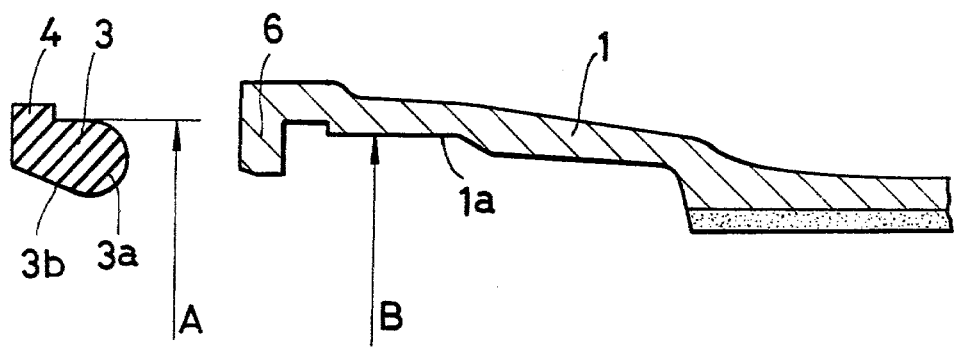
FIG. 2 is a fragmentary side elevation in vertical section illustrating a prior art female tubular joint and a fragmentary portion of an annular sealing member where the two elements are shown in an exploded fashion.

Slip-on type pipe joints are already known such as the one depicted by FIGS. 1 and 2, although in cross-section and in fragmentary form. In such a device an end portion or a socket 1 of one pipe is provided with an annular elastomeric sealing member 3, such as rubber. The sealing member is fitted internally of a radially inwardly facing peripheral surface of the socket. The socket thereby is adapted and constructed to receive in frictional engagement an end portion of a tubular member 2 or other type of pipe whereby the female member socket and the tubular member 2 are in a frictional fluid tight engagement. It will be noted that the sealing member 3 possesses a radially outwardly peripheral projection 4 at one end portion thereof. The projection 4 is adapted and constructed to mate into an inner radially inwardly facing groove 5 of the socket 1, thereby assisting to retain the sealing member. It will be seen that the open end of the socket possesses a radially inwardly extending flange 6. The main body portion 3a of the sealing member 3 possesses a radially inwardly facing peripheral surface 3b, which before the connection with tubular member 2 is completed, possesses a socket radially inwardly extending bulge as seen in cross-section in FIG. 2. With the insertion of tubular member 2 the aforementioned bulge is compressed outwardly radially. It has been discovered that to present the displacement of the sealing member 3 during the insertion of the tubular member 2, the sealing member 3 must be held in contact with the socket under sufficient pressure conditions. Additionally, the sealing member must not become dislodged under the aegis of gravity. Therefore, the sealing member 3 is given an outside diameter "A", which is about 1 to about 6%, preferably about 2.5 to 3.5%, larger than the inside diameter "B" of the socket 1. By employing such an arrangement the sealing member is somewhat held in place under the compressive forces of the annular sealing member as exerted against the inner peripheral surface of the socket. Of course the cooperative of groove 5 with projection 4 assists in restraining the sealing member from inwardly directed lateral movement under the influence during the insertion or removal of the tubular member 2.

Figure 3:
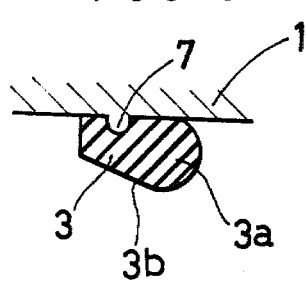
FIG. 3 is a fragmentary side elevation in vertical section illustrating another prior sealing member wherein another prior at female tubular joint is shown in severely curtailed fragmentary form in vertical section.

FIG. 3 illustrates another pipe joint in which a socket 1 is formed. In place of the aforementioned annular groove 5 as mentioned in conjunction with FIG. 1, the socket possesses an annular rib which is adapted and constructed to frictionally engage an outwardly radially facing groove provided in a modified sealing member 3.

Figure 4:
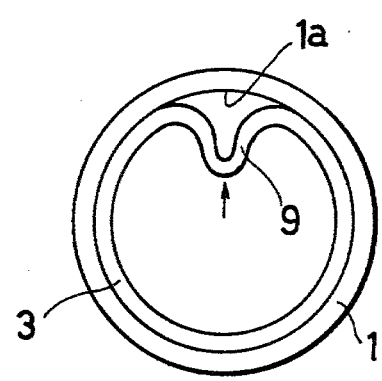
FIG. 4 is diagrammatic end view of a prior art female tubular joint being fitted with a prior art sealing member.
Figure 5:
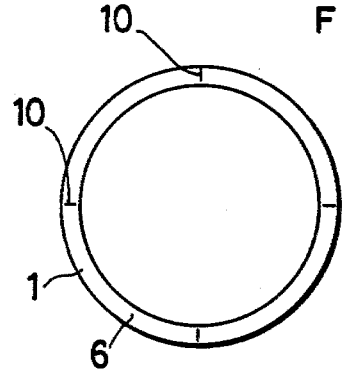
FIG. 5 illustrates diagrammatically the pressure vectors involved in the sealing member when inserted in place by a prior art method.
Figure 7:
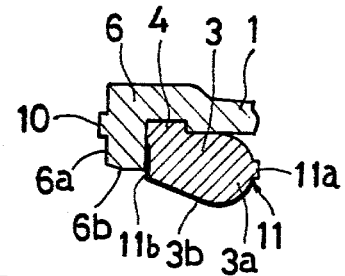
FIG. 7 is a fragmentary side elevation in vertical section of the tubular female member of the present invention as fitted with the sealing member of the present invention.
Figure 6:
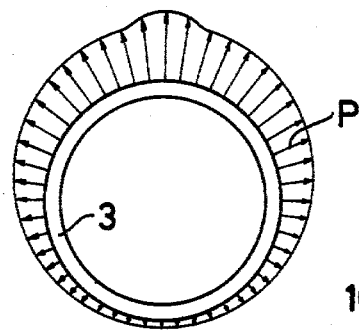
FIG. 6 is an end view schematically in a side by side manner showing the female tubular member and the annular sealing member as contemplated in the present invention.
Figure 8:
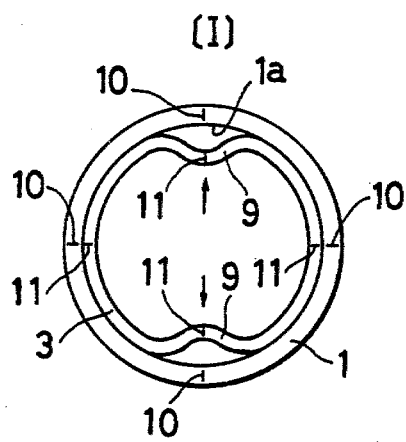
FIG. 8 (I) is an end schematic view illustrating a sealing member being fitted into the tubular female member of the present invention.
Figure 8:
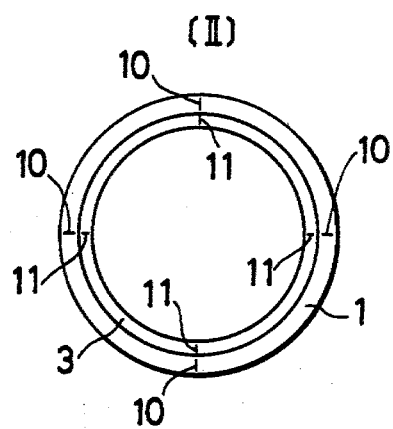

In assembling of such pipe joints, the sealing member 3 is positioned to the inner peripheral surface 1a if the socket 1, as by usually placing the sealing member 3 into the socket 1 with a circumferential portion of the member 3 folded inwardly as depicted by FIG. 4. This provides for the relatively simple at least positioning. Thereafter the folded portion 9 of the sealing member is pressed into contact with the said inner peripheral surface 1a in the direction of the arrow. It has been found that this method can be practiced relatively easily when the socket has a relatively small diameter, whereas some difficulties arise with sockets of larger diameters. With such sockets it is difficult to press the folded portion 9 if the outside diameter "A" of the sealing member 3 is more than 2% larger than the inside diameter "B" of the socket inner diameter. Under such situations when the folded portion 9 is forcibly pressed against the inner surface 1a of the socket, the sealing member frequently exerts uneven pressure "P" outwardly radially on the inwardly facing surface as demonstrated in FIG. 5. Consequently, in the region where the outwardly radiating pressure is low, the sealing member 3 would have a tendency to move laterally during the insertion of tubular member 2 when it is thrust into the socket 1, thereby failing to ensure the sought after fluid tight fit due to an imperfect fit. It has been found that the just mentioned tendency may be avoided by providing a plurality of deformed areas in the sealing member 3 in the form of uniformly circumferentially spaced apart inwardly directed depressions or what might be termed mine-folds. Thereafter the spaced depressions may be thrust outwardly radially against the inner surface of the socket. The sealing member is thereby held in place under essentially uniform pressure over the entire periphery inserted into the socket 1 while depressing some of the marked portions as shown. For example, diametrically opposed two portions 9 as seen in FIG. 8(I) are depressed while the remainder marks 11 are in alignment with the corresponding marks 10 on the socket. The depressed or slack portions 9 are thereafter pressed against the socket inwardly facing peripheral surface 1a in the direction of the arrows to set the marks 11 in juxtaposition with the marks 10 on the socket. In this manner, the sealing member 3 can be completely uniformly positioned into place as depicted in FIG. 8(II).

Figure 9:
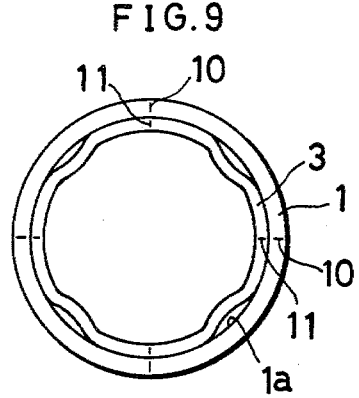
FIG. 9 is a schematic view illustrating the sealing member after it has been partially positioned into a female tubular member.

In another embodiment when sealing member 3 adapted for a pipe of even larger diameter is to be installed, the sealing member 3 is positioned into the socket 1 with a greater degree of uniformity by placing the sealing member 3 thereinto with all the four marks 11 set to the corresponding marks 10 while providing for depressions between the marks on the sealing member 3. Thereafter the said four depressions are thrust against the inner peripheral surface 1a of the socket, as seen in FIG. 9. In this case, the sealing member 3 installed as hereinbefore just described is more securely affixed if the aforementioned engaging projection 4 of the sealing member 3 is designed to possess a slightly larger width than the annular groove 5 plus with the projection 4 and the groove 5 somewhat enlarged in height and width respectively.

It is submitted the present herein taught method in which the sealing member 3 is positioned into a socket with the marks 10 and 11, wherein marks 11 comprises projections 11a molded integrally therewith an the rear side, as mentioned, namely, on the curved portion of its main body 3a, and a line 11b drawn in paint or by marker from the molded projection 11a over the tapered inwardly facing peripheral surface 3b to the front side of the sealing member 3. It is submitted that due to the projections 11a formed on the curved portion being out of contact with either the socket's inwardly facing peripheral surface or the radially outwardly facing surface of the tubular member 2, there will in no way be an adverse effect on the fluid tightness afforded by the sealing member 3.

Due to the projections 11a, lines 11b can be easily drawn therefrom as equidistantly spaced apart circumferentially on the sealing member 3. The lines 11b extending to the front side of the sealing member 3 also enable the assembler to readily set the marks 11 corresponding, to the marks 10 on the socket end face. While projections formed on the surface of the sealing member 3 may be usually difficult to visually distinguish owning to the dark color of the rubber material, the assembler should have no difficulty in identifying the marks 11 by virtue of the rendition of the line 11b. It should be appreciated that the marks 11 on the sealing member 3 as described are nevertheless in no way limitative but may be otherwise designed suitably in accordance with the requirements involved as is the case with the marks 10 on the socket 1.

In order to fit the sealing member 3 into the socket 1, the said sealing member 3 is thrust into said socket. However, guidance means must be provided as an unskilled person would be unable to form a plurality of inwardly directed depressions at relatively equal spacings and to thereafter press such depressions easily outwardly uniformly. It is one of the foremost purposes of the present invention to provide guidance means to achieve a uniformly placed sealing member.

DETAILED DESCRIPTION OF THE INVENTION

Figure 10:
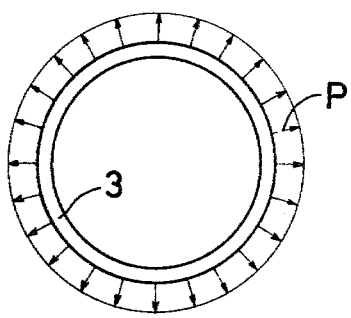
FIG. 10 is a diagrammatic illustration of the pressure distribution presented after the said sealing member has been secured in place following the precepts of the present invention.
Figure 11:
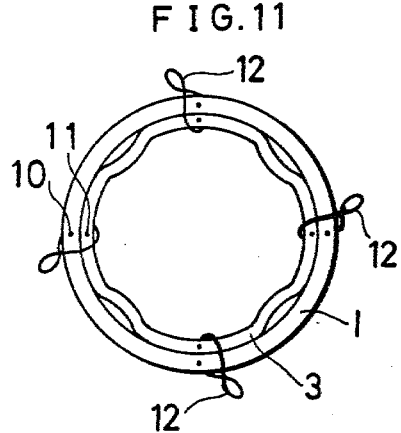
FIG. 11 is a front end view illustrating a female tubular member and an annular sealing member after being temporarily held in place together by clamps at those portions where the two elements are in touching relationship in accordance with the method of another embodiment of the present invention.
Figure 12:
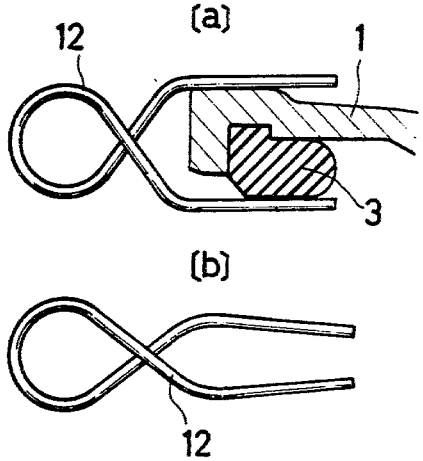
FIG. 12 (a) is an enlarged fragmentary cross-sectional illustrating a portion held in place as noted in FIG. 11.

Having discussed the fact that the sealing means and the socket arrangement is known, attention is now directed to the remaining drawings for a view of the precepts of the invention, but the basic structure involved herein should not be forgotten. Accordingly, attention is now directed to FIGS. 6–10. Firstly, it should be noted that four visual marks 10 are provided on the end face 6a of flange 6 of a socket 1. These marks are spaced equidistantly circumferentially with respect to the end face. Similarly, corresponding marks 11 are formed on the inwardly facing portion of the sealing member 3. In another embodiment, the marks 10 on the socket 1 may be provided on the inwardly facing peripheral surface 1a thereof or on the inwardly facing peripheral portion 6b of the flange 6. The said marks 10 may be easily provided in the form of projections integral with the socket when it is manufactured. Marking-off lines, or liner or symbols drawn with paint or by marker are also useful as marks 10. Preferably the marks 11 on the sealing member 3 alignment provides for ease in assembly without the need to employ a skilled person therefor. In fact, it has been discovered that the sealing member 3 will provide essentially uniform pressure P as depicted in FIG. 10 when assembled by almost any person. Consequently, the sealing member 3 can be essentially completely prevented from being dislodged by tubular member 2 when it is thrust into the socket 1. The various parts can therefore be assembled expeditiously and efficiently. For example, it has been observed that unmarked sealing members 3 required an average of two minutes for installation on pipes of 900 mm. in diameter, whereas the same procedure may be completed in approximately 30 seconds if assembly is accomplished in accordance with the precepts of the present invention.

Although the marks 10 and 11 in the foregoing embodiment are provided in only four locations, a suitable number of marks 10 and 11 are usable in accordance with the requirements involved.

Attention is now directed to FIGS. 11 to 14 for another embodiment of the present invention. As heretofore, a socket 1 is provided having on its end face a plurality of positioning marks 10 equidistantly spaced apart circumferentially thereof, in corresponding relationship to marks 11 similarly provided on a sealing member 3. The sealing member 3 is inserted into the socket 1 with the marks 11 set opposite or in alignment to the marks 10, and the sealing member 3 is fastened to the socket 1 by a plurality of clamps 12 at the sites where the marks are aligned.

The clamp 12, has the form of a figure eight with one end in an open condition. It is constructed of a length of spring steel wire that has been bent over at its midportion and then cross legged to provide opposite legs extending approximately convergingly to each other in the direction of the free ends. The legs are adapted and constructed to resiliently clamp the sealing member 3 and socket 1 at selected sites. It is within the purview of the invention to employ other types of retaining means such as screw clamps or vises of various sorts.

Subsequent to the clamping of those portions that have been marked, the socket 1 and the sealing member 3 are clamped together at the various unfastened portions by another type of clamping device 13. As in connection with clamp 12, the clamping device 13 comprises a similarly shaped spring member having opposite legs serving as clamping portions 14 for resiliently retaining the assembly. Each of the clamping portions is supplied with a freely rotatable cylinder which is a roller 15.

Figure 13:
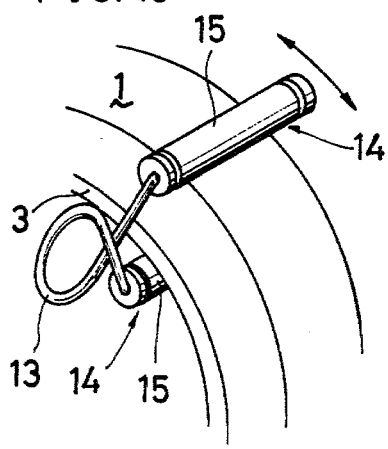
FIG. 13 is a fragmentary perspective view showing a portion of the female tubular member and the annular sealing member being brought into clamping relationship at an unheld portion by another device having clamping rollers.
Figure 14:
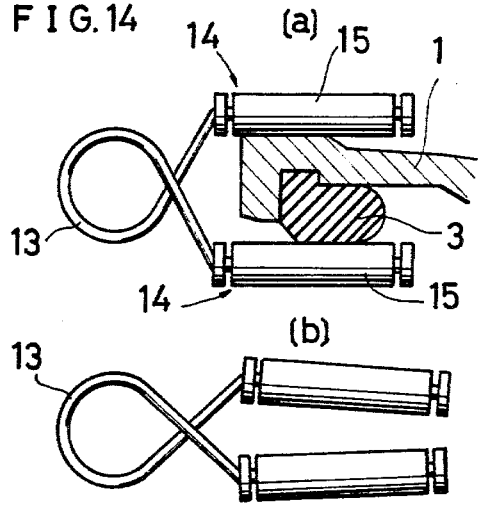
FIG. 14 (a) is a view in cross-section illustrating the clamping action of said another device.

The just described clamping device 13, possessed with the said rollers 15, is arcuately movable on the partially assembled sealing member in the socket as indicated by the arrows in FIG. 13. The sealing member 3 possessing the depressions, that is, somewhat slack portions where they are not secured by the aforementioned clamps 12 are forced into pressing contact with aforementioned inner surface of the socket 1 by the clamping device 13 when it is circumferentially and reciprocatingly moved.

Accordingly to the method described above, the sealing member can be fitted into the socket by inserting the sealing member into the socket as matched therewith in position to provide equidistantly spaced slack portions in the sealing member, fastening the sealing member to the socket at the matched portions, clamping the resulting assembly at an unfastened portion by a device having clamp rollers and moving the device circumferentially of the assembly while retaining the device in clamping engagement with the assembly. The sealing member is therefore retainable in position despite the movement of the clamping device, which in turn effectively eliminates slacks from the unfastened portions of the sealing member by its pressing action. Thus the sealing member is fittable to the socket inner surface with higher reliability than when it is manually pressed against the surface. With the sealing member set in position relative to the socket as above, the sealing member in its entirety is uniformly fittable to the socket and has a uniform counteracting force circumferentially thereof, so that when released from the clamps and from the movable clamping device, the sealing member will not locally slack or hang down. Because of these advantages, the sealing member, even if having a large diameter, can be installed in place with an exceedingly uniform press fit as desired.

What is claimed is:

1. A method of coaxially positioning an annular sealing member into a tubular connector through an open end thereof, the sealing member having a larger outside diameter than the inside diameter of the tubular connector comprising the steps of:
   (a) providing a plurality of equidistantly circumferentially spaced marks on an end portion of the tubular connector,
   (b) providing an identical number of equidistantly circumferentially spaced marks on an edge portion of the sealing member as on said tubular connector,
   (c) inserting the sealing member into said open end of the tubular connector,
   (d) rotatably adjusting relatively said tubular connector and said sealing member relative to each other to align their respective marks,
   (e) providing a plurality of slack portions extending inwardly in said sealing member during said insertion and adjustment steps wherein each said slack portion on the sealing member is located between any two of those portions that are marked, and
   (f) thereafter pressing said slack portions of the sealing member radially against said tubular connector.

2. The method of claim 1 wherein between step (e) and (f) the following step is included:

(e') fastening the sealing member and the tubular connector together by temporary clamping means at the positions where the marks on the sealing member are in alignment with the correspondent marks on the tubular connector, and 3. The method according to claim 2 wherein the step (f) comprises pressing said slack portions of the sealing member radially against said tubular connector by successively applying pressure to the slack portions thereof.

* * * * *